United States Patent [19]

Humble

[11] Patent Number: 4,553,714
[45] Date of Patent: Nov. 19, 1985

[54] FISHING REEL WITH A VARIABLE PRESSURE CLICK PAWL

[75] Inventor: Raymond Humble, Alnwick, England

[73] Assignee: Hardy Bros (Alnwick) Ltd., Alnwick, England

[21] Appl. No.: 523,458

[22] Filed: Aug. 15, 1983

[30] Foreign Application Priority Data

Aug. 16, 1982 [GB] United Kingdom ............... 8223516

[51] Int. Cl.⁴ .............................................. A01K 89/02
[52] U.S. Cl. ............................ 242/84.1 R; 74/577 S;
188/71.1; 188/82.7; 242/84.51 R
[58] Field of Search ................ 242/84.51 R, 84.51 A,
242/84.1 R, 84.2 R, 84.5 A; 74/577 S;
188/82.7, 71.1, 30; 254/223, 357, 376

[56] References Cited

U.S. PATENT DOCUMENTS

| Re. 8,842 | 8/1879 | Hyde | 254/357 |
|---|---|---|---|
| 386,705 | 7/1888 | Graham | 242/84.51 R |
| 1,637,334 | 8/1927 | Catucci | 242/84.51 R |
| 1,810,573 | 6/1931 | Perrine | 242/84.5 R |
| 2,191,004 | 2/1940 | Whitcomb | 242/84.51 R |
| 2,458,298 | 1/1949 | Polevoy | 242/84.51 R X |
| 2,578,978 | 12/1951 | Mandolf et al. | 242/84.51 R |
| 2,706,614 | 4/1955 | Gilbert | 254/376 X |
| 3,241,788 | 3/1966 | Visockis | 242/84.51 R |
| 3,827,649 | 8/1974 | Payen | 242/84.51 R X |
| 4,442,983 | 4/1984 | Moll | 242/84.51 R |

FOREIGN PATENT DOCUMENTS

| 20908 | 1/1935 | Australia | 242/84.51 R |
|---|---|---|---|
| 612 | of 1891 | United Kingdom | 242/84.51 R |
| 145904 | 7/1920 | United Kingdom | 242/84.51 R |

Primary Examiner—Stuart S. Levy
Assistant Examiner—Joseph J. Hail, III
Attorney, Agent, or Firm—Harold W. Milton, Jr.

[57] ABSTRACT

A fly fishing reel having a rotatable drum and a surrounding cage carrying the drum, in which a check mechanism comprises a check wheel mounted co-axially on the drum has radially disposed teeth engaged by a check tongue adjustably mounted on the cage.

7 Claims, 5 Drawing Figures

4,553,714

FISHING REEL WITH A VARIABLE PRESSURE CLICK PAWL

INTRODUCTION

This invention relates to a fishing reel, particularly to a fly fishing reel.

PRIOR ART

Fly fishing reels normally comprise a cage, which is attached to the fishing rod by means of a saddle, the cage carrying a rotatable drum on which the line is wound. Many different forms of fly fishing reels have previously been proposed and they normally incorporate a check mechanism which inhibits rotation of the drum as the line is running out.

It is important that a fly fishing reel be light in weight, small in size but yet hold an adequate length of line.

OBJECT OF THE INVENTION

It is the main object of this invention to provide a fly fishing reel which possesses the above mentioned desirable characteristics with a simple construction.

STATEMENTS OF INVENTION

According to the present invention there is provided a fishing reel including a rotatable drum and a cage carrying the drum and having a check mechanism comprising a check wheel having radially disposed teeth and a check tongue for engagement with the teeth.

The check wheel may be mounted on the drum and the check tongue may be spring centred on the cage.

The tongue may be spring centred by a flat spring having a tongue engaging portion and two side portions.

The check tongue may be triangular in shape and pivoted at its centre, one apex acting to engage the check wheel and each of the other two apices being affected by the spring pressure effective in one of the side portions of the spring.

Means may be provided for adjusting the spring pressure effective on the check tongue from one of the side portions.

The means for adjusting the spring pressure may be a regulator cam rotatable to distort one of the side portions of the spring and thereby to vary the pressure exerted by that side portion on one of the apices of the check tongue.

The regulator cam may vary the pressure on the spring through a plunger, selectively positionable to affect one or the other of side portions of the spring to achieve left or right hand wind.

DRAWINGS

One embodiment of fishing reel in accordance with the invention will now be described by way of example only and with reference to the accompanying drawings in which FIG. 1 is a longitudinal cross sectional view through the reel;

SPECIFIC DESCRIPTION

Figure 1:
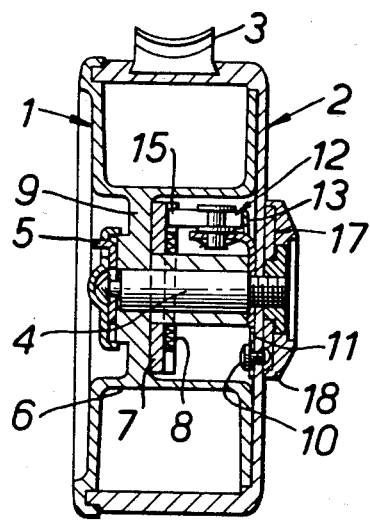
Figure 2:
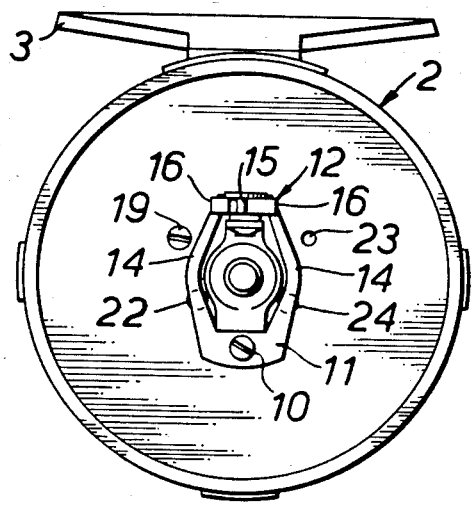
FIG. 2 is an end view of the reel of FIG. 1.

The fly fishing reel illustrated in the drawings includes a rotatable drum 1 with a handle (not shown), the drum being carried by a cage 2 having a saddle 3 so that the reel may be attached to a rod in conventional manner. The cage 2 is provided with a central shaft 4 on which the rotatable drum 1 is mounted. Release mechanism 5 is provided so as to enable the drum 1 and the cage 2 to be separated if necessary. Mounted within drum hub 6 of drum 1 is a check wheel 7 having radially disposed teeth 8. This check wheel 7 is fixed to web 9 by screws.

Fixed by screw 10 to cage 2 is a flat spring 11 which bears upon a check tongue 12 which engages the check wheel 7. The spring 11 bears upon the check tongue 12 by a tongue engaging portion 13. The spring 11 also has two side portions 14. The check tongue 12 is substantially triangular with one apex 15 engaging the check wheel 7, whereas the other two apices 16 each engage one of the side portions 14 of the spring 11. The check tongue 2 is thus centred by the spring 11.

Figure 3:
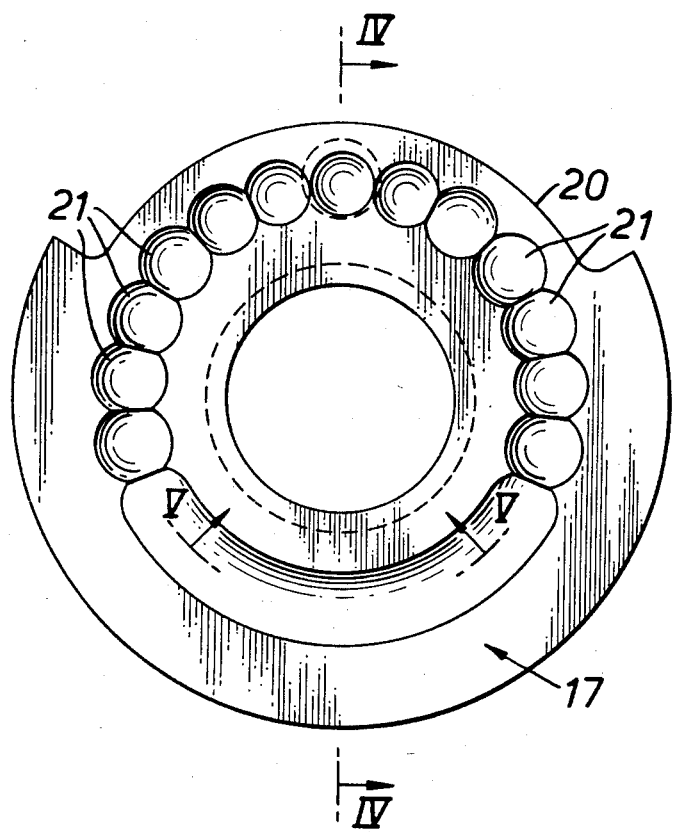
FIG. 3 is a front view of the regulator cam incorporated in the reel of FIGS. 1 and 2.
Figure 4:
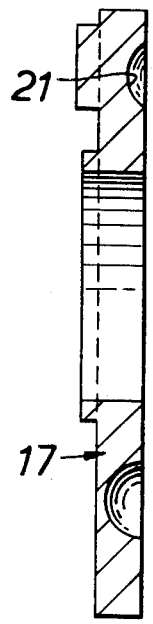
FIG. 4 is a sectional view on line iv iv.
Figure 5:
FIG. 5 is a sectional view on the line v v of FIG. 3.

It is desirable for the check setting to be variable and for this purpose a regulator cam 17 is porvided (see particularly FIGS. 3, 4 and 5) mounted within a regulator knob 18 having a serrated periphery so as to be rotated to effect precise setting of the cam. The degree of movement of the cam is limited by a stop screw 19 located in an arcuate recess 20 in the periphery of cam 17. On one face of cam 17 are a series of indents 21 and, as will be seen from FIG. 5, these indents vary gradually from shallow to deep, thus giving several settings for the checking of the reel. The degree of check setting of the reel is determined by the position of cam 17, whereby the indents 21 vary the position of a plunger 22 which distorts one side portion 14 of the spring 11. The degree of distortion affects the amount of spring pressure which that side portion brings to bear on the apex 16 of the check tongue 12.

If it is desired for the reel to be adapted for left hand wind, then the stop screw 19 is removed and positioned in screw threaded hole 23 and the plunger 22 is positioned within bore 24. Thus the other side portion 14 of spring 11 will be affected by the position of cam 17.

It will be appreciated that with the configuration of the check mechanism in accordance with the invention, the overall size of the reel may be reduced and the means whereby a check of a running line may be adjusted to suit the angler is by virtue of an uncomplicated piece of mechanism. The arrangement enables a large diameter hub to be achieved with the consequent long length of line held on the drum.

I claim:

1. A fishing reel including a rotatable drum (1) having a central axis (4) of rotation and a cage (2) carrying the drum and having a check mechanism comprising a check wheel (7) having radially disposed teeth (8) projecting in a direction parallel to said axis (4) of rotation, a check tongue (12), a pivotal connection pivotally connecting said tongue to said reel at a position spaced axially from said axis (4) for pivotal movement in opposite directions to engage said teeth upon rotation of said check wheel in opposite directions, said tongue (12) extending from said pivotal connection in a direction parallel to said axis (4) of rotation for engagement with the teeth (8), said pivotal connecting of said tongue (12) having a pivot axis at a right angle relative to said central axis (4); and biasing means for biasing said tongue in both directions of pivotal movement about said pivotal connection and into engagement with said teeth in both directions of rotation of said wheel.

2. A fishing reel as claimed in claim 1 wherein said biasing means comprises a flat spring having a tongue engaging portion and two side portions for centering said tongue.

3. A fishing reel as claimed in claim 2, in which the check tongue is triangular in shape and pivoted at its centre, one apex acting to engage the check wheel and each of the other two apices being affected by the spring pressure effective in one of the side portions of the spring.

4. A fishing reel as claimed in claim 3, in which means is provided for adjusting the spring pressure effective on the check tongue from one of the side portions.

5. A fishing reel is claimed in claim 4, in which the means for adjusting the spring pressure is a regulator cam rotatable to distort one of the side portions of the spring and thereby to vary the pressure exerted by that side portion on one of the apices of the check tongue.

6. A fishing reel as claimed in claim 5, in which the regulator cam varies the pressure on the spring through a plunger, selectively positionable to affect one or the other of side portions of the spring to achieve left or right hand wind.

7. A fishing reel including a rotatable drum and a cage carrying the drum and having a check mechanism comprising a check wheel having radially disposed teeth and a check tongue for engagement with the teeth, said reel including a flat spring having a tongue engaging portion for centering the tongue and two side portions, the reel including means for adjusting the spring pressure effective on the check tongue from one of the side portions, said adjusting means including a regulator cam rotatable to distort one of the side portions of the spring for varying the pressure exerted by that side portion on one of the apexes of the check tongue, the regulator cam varying the pressure on the spring through a plunger, said regulator cam including at least one face having a series of indents varying gradually in depth, said plunger having one end in abutting contact with said spring and a second end seated in one of said indents whereby said indents vary the position of said plunger to selectively distort said spring and thereby effect the amount of spring pressure on said check tongue.

* * * * *